United States Patent
Oreifej et al.

(10) Patent No.: US 11,899,753 B2
(45) Date of Patent: Feb. 13, 2024

(54) LOW-LIGHT IMAGE SELECTION FOR NEURAL NETWORK TRAINING

(71) Applicant: Synaptics Incorporated, San Jose, CA (US)

(72) Inventors: Omar Oreifej, Campbell, CA (US); Karthikeyan Shanmuga Vadivel, San Jose, CA (US); Patrick A. Worfolk, San Jose, CA (US); Kirk Hargreaves, Mountain View, CA (US)

(73) Assignee: Synaptics Incorporated, San Jose, CA (US)

( * ) Notice: Subject to any disclaimer, the term of this patent is extended or adjusted under 35 U.S.C. 154(b) by 196 days.

(21) Appl. No.: 17/317,480

(22) Filed: May 11, 2021

(65) Prior Publication Data
US 2022/0366189 A1 Nov. 17, 2022

(51) Int. Cl.
*G06V 10/56* (2022.01)
*G06F 18/214* (2023.01)
*G06T 7/00* (2017.01)
*G06F 18/2433* (2023.01)
*G06V 10/46* (2022.01)

(52) U.S. Cl.
CPC ...... *G06F 18/2148* (2023.01); *G06F 18/2433* (2023.01); *G06T 7/0004* (2013.01); *G06V 10/56* (2022.01); *G06T 2207/20084* (2013.01); *G06T 2207/20221* (2013.01); *G06T 2207/30168* (2013.01); *G06V 10/467* (2022.01)

(58) Field of Classification Search
CPC .. G06K 9/6257; G06K 9/6284; G06T 7/0004; G06T 2207/20084; G06T 2207/20221; G06T 2207/30168; G06V 10/56; G06V 10/467
See application file for complete search history.

(56) References Cited

FOREIGN PATENT DOCUMENTS

JP 2015033107 A * 2/2015 ........... G06T 3/4015

OTHER PUBLICATIONS

Zhang, Y., Zhang, J. and Guo, X., 2019, October. Kindling the darkness: A practical low-light image enhancer. In Proceedings of the 27th ACM international conference on multimedia (pp. 1632-1640).*
(Continued)

*Primary Examiner* — Zhitong Chen
(74) *Attorney, Agent, or Firm* — Paradice & Li LLP

(57) ABSTRACT

This disclosure provides methods, devices, and systems for low-light imaging. The present implementations more specifically relate to selecting images that can be used for training a neural network to infer denoised representations of images captured in low light conditions. In some aspects, a machine learning system may obtain a series of images of a given scene, where each of the images is associated with a different SNR (representing a unique combination of exposure and gain settings). The machine learning system may identify a number of saturated pixels in each image and classify each of the images as a saturated image or a non-saturated image based on the number of saturated pixels. The machine learning system may then select the non-saturated image with the highest SNR as the ground truth image, and the non-saturated images with lower SNRs as the input images, to be used for training the neural network.

20 Claims, 8 Drawing Sheets

(56) References Cited

OTHER PUBLICATIONS

Zhang, T. and Zhu, Z., May 2019, Interpreting adversarially trained convolutional neural networks. In International Conference on Machine Learning (pp. 7502-7511). PMLR.*

Tsai, C.M. and Lee, H.J., 2002. Binarization of color document images via luminance and saturation color features. IEEE Transactions on Image Processing, 11(4), pp. 434-451.*

Chen et al., "Learning to See in the Dark," arXiv: 1805.01934v1 [cs.CV], pp. 1-10, May 4, 2018.

* cited by examiner

LOW-LIGHT IMAGE SELECTION FOR NEURAL NETWORK TRAINING

TECHNICAL FIELD

The present implementations relate generally to neural networks, and specifically to low-light image selection for neural network training.

BACKGROUND OF RELATED ART

Images captured of a scene in low light conditions (also referred to as "low-light images") may exhibit poor contrast and significant noise (or color distortion) due to low photon count incident on the photosensors of the image capture device (such as a camera). Example techniques for improving low-light image quality include, but are not limited to, increasing the amount of illumination (or illuminance) in the scene, increasing the exposure duration or aperture size, and increasing the gain of the photosensors. Although each of these techniques may produce a brighter overall image, the resulting image may not accurately capture the scene as intended. For example, increasing the illuminance requires altering the scene itself, which often may not be practical. On the other hand, increasing the exposure time can result in visual artifacts such as motion blur. Further, increasing the gain of the photosensors also may amplify the noise in the image.

Image processing enables a captured image to be rendered on a display such that the original scene can be reproduced as accurately as possible given the capabilities or limitations of the image capture device. For example, an image processor may adjust the pixel values for images that are captured under low light conditions to correct for inaccuracies in brightness, color, and noise. Existing image processing techniques apply algorithmic filters to determine the adjusted pixel values. Algorithmic filters depend on careful parameter selection, which limits the optimal effectiveness of image processing to a narrow range of image capture conditions. For example, algorithmic filters may not be suitable for image processing of short-exposure images captured in extremely low light conditions.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of training neural networks. The method includes steps of obtaining a series of images of a scene, where each of the images includes a plurality of pixel values; determining a number of pixel values of the plurality of pixel values in each image that are equal to a pixel saturation value; selecting a representative image from the series of images based at least in part on the number of pixel values in each image that are equal to the pixel saturation value; and training a neural network to reproduce the representative image based on one or more of the remaining images in the series.

Another innovative aspect of the subject matter of this disclosure can be implemented in a machine learning system including a processing system and a memory. The memory stores instructions that, when executed by the processing system, causes the machine learning system to obtain a series of images of a scene, where each of the images includes a plurality of pixel values; determine a number of pixel values of the plurality of pixel values in each image that are equal to a pixel saturation value; select a representative image from the series of images based at least in part on the number of pixel values in each image that are equal to the pixel saturation value; and train a neural network to reproduce the representative image based on one or more of the remaining images in the series.

Another innovative aspect of the subject matter of this disclosure can be implemented in a method of training neural networks. The method includes steps of obtaining a series of images of a scene, each of the images including a plurality of pixel values; determining a number of pixel values of the plurality of pixel values in each image that are equal to a pixel saturation value; selecting first and second representative images from the series of images based at least in part on the number of pixel values in each image that are equal to the pixel saturation value; generating a ground truth image based on the selected representative images; and training a neural network to reproduce the ground truth image based on one or more of the images in the series.

BRIEF DESCRIPTION OF THE DRAWINGS

The present embodiments are illustrated by way of example and are not intended to be limited by the figures of the accompanying drawings.

DETAILED DESCRIPTION

Figure 1:
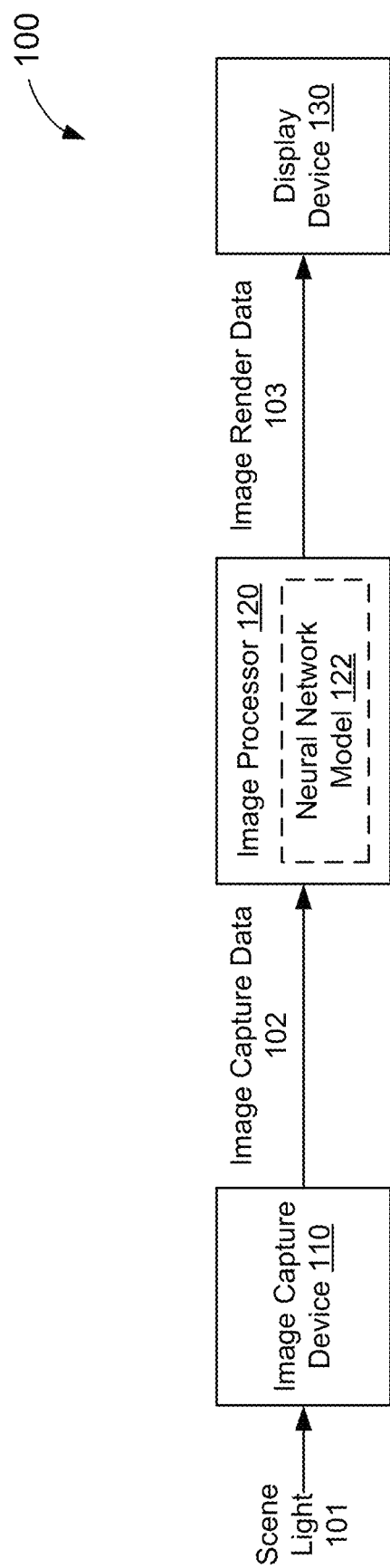
FIG. 1 shows a block diagram of an example image capture and display system, according to some implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Various implementations relate generally to low-light imaging. Some implementations more specifically relate to selecting images that can be used for training a neural network to infer denoised representations of images captured in low light conditions (also referred to as "low-light images"). During training, the neural network may compare short-exposure images of a scene captured in low light conditions (also referred to as "input images") with representative images of the same scene that contain little or no noise (also referred to as "ground truth images"). More specifically, the neural network may learn a set of rules (also referred to as a "neural network model") that can be used to reproduce the ground truth images from the input images. An image processor may then use the neural network model to reduce or remove noise associated with low-light images, for example, by inferencing denoised images based on the low-light images.

Aspects of the present disclosure recognize that the training of the neural network requires careful selection of ground truth and input image pairs. For example, the ground truth image should have a relatively high signal-to-noise ratio (SNR) and each of the input images should have a lower SNR than that of the ground truth image. In some implementations, a machine learning system may obtain a series of images of a given scene, where each of the images is captured with a different SNR (representing a unique combination of exposure and gain settings). The machine learning system may further classify each of the images as a saturated image or a non-saturated image based on a number of saturated pixels in each image. The machine learning system may then select the non-saturated image with the highest SNR as the ground truth image, and one or more non-saturated images with lower SNRs as input images, to be used for training the neural network.

Particular implementations of the subject matter described in this disclosure can be implemented to realize one or more of the following potential advantages. In the present implementations, an image processor may use neural networks to perform denoising operations in a manner that is less computationally intensive compared to existing denoising algorithms. By obtaining a series of images of the same scene with different gain and exposure settings, aspects of the present disclosure may train the neural network to learn a set of rules that can be applied to a wide range of image capture conditions (including extreme low-light conditions). In addition, aspects of the present disclosure may automate the process of selecting ground truth and input image pairs that can be used to train the neural network. For example, by analyzing the number of saturated pixels in each image, the machine learning system of the present implementations may filter or remove any images from the series that may not be suitable for training (such as the saturated images).

FIG. 1 shows a block diagram of an example image capture and display system 100, according to some implementations. The system 100 includes an image capture device 110, an image processor 120, and display device 130. The image capture device 110 (such as a camera) captures a pattern of light 101 from a scene and converts the light 101 to digital image capture data 102. The image capture data 102 may include an array of pixels (or pixel values) representing a digital image of the scene. The display device 130 (such as a television, computer monitor, smartphone, or any other device that includes an electronic display) renders or displays the digital image by reproducing the light pattern on an associated display surface.

The image processor 120 converts the image capture data 102 to image render data 103 that more accurately reflects the original scene captured by the image capture device 110. For example, the original scene may be more accurately reproduced on the display device 130 using the image render data 103 than the image capture data 102. In some implementations, the image processor 120 may be configured to correct various pixel distortions in the image capture data 102 to improve the quality of the digital image. Example pixel distortions include, but are not limited to, vignetting, aberration, and noise. Although depicted as an independent block in FIG. 1, in actual implementations the image processor 120 may be incorporated or otherwise included in the image capture device 110, the display device 130, or a combination thereof.

As described above, low-light images may exhibit poor contrast and significant noise (or color distortion) due to low photon count incident on the photosensors of the image capture device 110. Example techniques for improving low-light image quality include, but are not limited to, increasing the amount of illumination (or illuminance) in the scene, increasing the exposure duration or aperture size, and increasing the gain of the photosensors. Although each of these techniques may produce a brighter overall image, the resulting image may not accurately capture the scene as intended (or as perceived by the human eye). Moreover, such low-light image enhancement techniques may further introduce additional artifacts or noise into the captured image.

In some implementations, the image processor 120 may be configured to enhance low-light images in a manner that preserves the brightness levels of the original images while reducing the amount of noise associated therewith. For example, the image processor 120 may receive image capture data 102 representing a short-exposure image captured of a scene in low light conditions and may output image render data 103 that is a denoised representation of the original image (also referred to as a "denoised image"). In other words, the image processor 120 may perform a denoising operation on the image capture data 102 that filters or removes noise from the original image.

In some implementations, the image processor 120 may perform the denoising operation based on a neural network model 122 that is trained through machine learning. Machine learning is a technique for improving the ability of a computer system or application to perform a certain task. During a training phase, a machine learning system may be provided with multiple "answers" and one or more sets of raw data to be mapped to each answer. For example, a machine learning system may be trained to perform denoising operations on low-light images by providing the system with a large number of short-exposure images captured of a scene in low-light conditions (which represents the raw data) and one or more representative images of the same scene that contain little or no noise (which represents the answer).

The machine learning system may then analyze the raw data to "learn" a set of rules that can be used to reproduce the representative images from the low-light images. For example, the machine learning system may perform statistical analysis on the raw data to determine a common set of features (also referred to as "rules") that can be associated with noise. Deep learning is a particular form of machine learning in which the model being trained is a multi-layer neural network. Deep learning architectures are often referred to as artificial neural networks due to the way in which information is processed (similar to a biological nervous system).

For example, each layer of the deep learning architecture may be composed of a number of artificial neurons. The neurons may be interconnected across the various layers so that input data (or the raw data) may be passed from one layer to another. More specifically, each layer of neurons may perform a different type of transformation on the input data that will ultimately result in a desired output (such as a denoised image). The interconnected framework of neurons may be referred to as a neural network model. Thus, the neural network model 122 may include a set of rules that can be used to "infer" denoised representations of low-light images. As such, the image processor 120 may use the neural network model 122 to reduce noise associated with an image (or image capture data 102).

Figure 2:
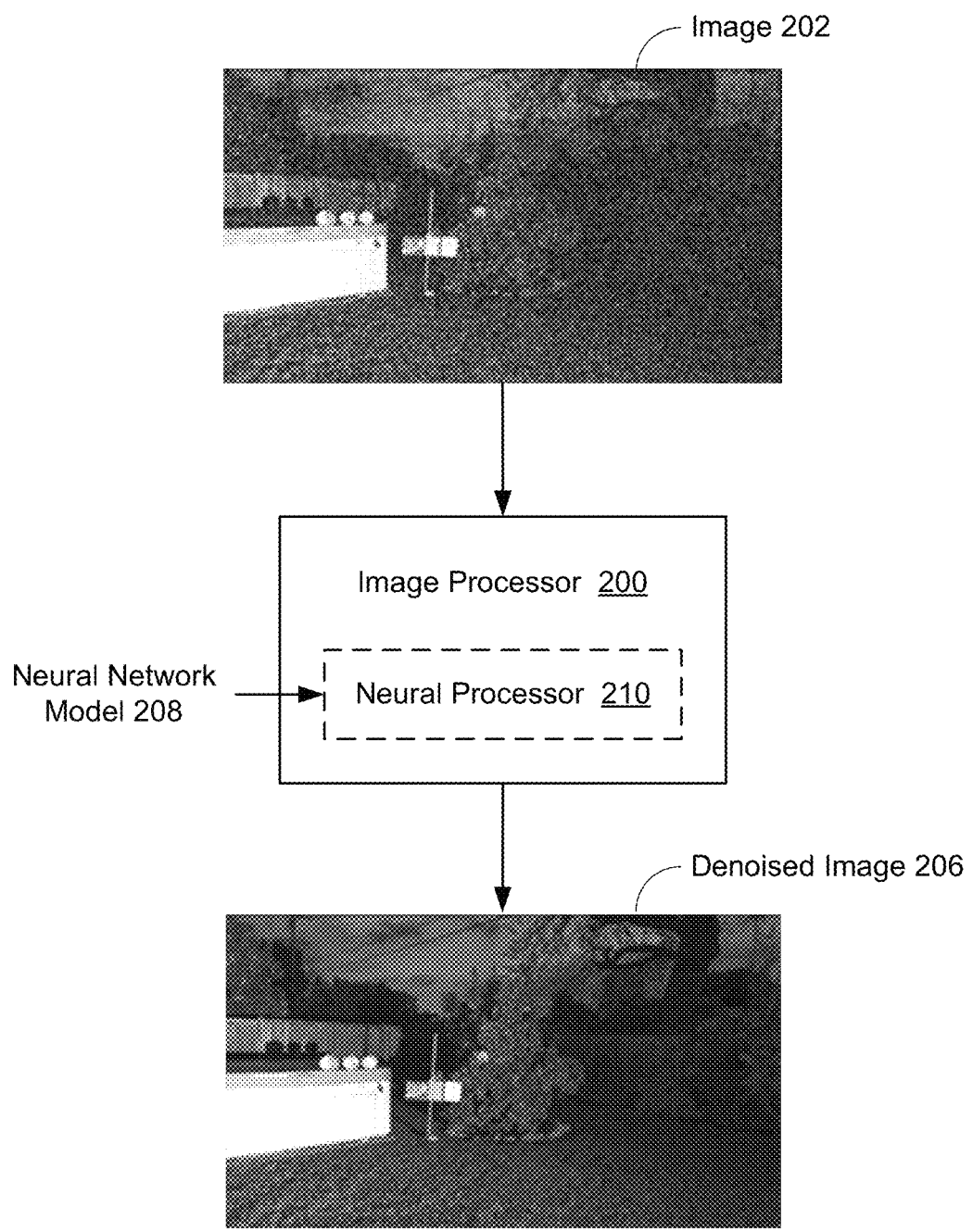
FIG. 2 shows a block diagram of an example image processor, according to some implementations.

FIG. 2 shows a block diagram of an example image processor 200, according to some implementations. In some implementations, the image processor 200 may be one example of the image processor 120 of FIG. 1. Thus, the image processor 200 may be configured to receive an image 202 and output a denoised image 206. With reference for example to FIG. 1, the image 202 may be associated with the image capture data 102 and the denoised image 206 may be associated with the image render data 103.

In some implementations, the image processor 200 may generate the denoised image 206 by performing a denoising operation on the input image 202 that reduces the amount of noise associated therewith. In the example of FIG. 2, the image 202 depicts a scene captured by an image capture device (such as the image capture device 110) in low-light conditions. As a result, the scene depicted in the image 202 appears noisy or grainy. For example, the distribution of pixels in the image 202 contains "spikes" in brightness and color (such as dark pixels in bright regions of the scene and bright pixels in dark regions of the scene). In contrast, the color and brightness of pixels in the denoised image 206 follow a substantially smooth distribution. For example, dark regions of the scene appear dark and bright regions of the scene appear bright in the denoised image 206.

In some implementations, the image processor 200 may include a neural processor 210. The neural processor 210 may include one or more processors that are configured to accelerate neural network inferencing. For example, the hardware architecture of the neural processor 210 may be designed to traverse neural networks more quickly or efficiently than a general-purpose processor. The neural processor 210 may implement a neural network based on a neural network model 208. In some implementations, the neural network model 208 may be one example of the neural network model 122 of FIG. 1. Thus, the neural network model 208 may include a set of rules that can be used to infer a denoised representation of a low-light image. As such, the neural processor 210 may infer the denoised image 206 based, at least in part, on the image 202.

In some implementations, the neural network model 208 may be produced by training a neural network to recreate low-noise ground truth images based on noisy input images. Thus, the effectiveness of the denoising operation depends on the ground truth and input images provided to the neural network during training. In some aspects, the ground truth and input images may be manually selected or procured by a user or operator of the machine learning system. For example, a user may carefully adjust the settings of an image capture device to acquire a low-noise ground truth image of a scene and may subsequently lower the exposure duration of the image capture device to acquire one or more noisy input images of the scene. However, the process of manually procuring ground truth and input image pairs is very time consuming and produces only a limited set of data that can be used for training the neural network.

In the present implementations, a machine learning system may programmatically select a ground truth image and one or more input images from a series of images captured with different exposure and gain settings. Aspects of the present disclosure recognize that the ground truth image should have a relatively high signal-to-noise ratio (SNR) and each of the input images should have a lower SNR than that of the ground truth image. Aspects of the present disclosure also recognize that some images in the series may not be suitable for training a neural network to perform a denoising operation (such as images that are substantially saturated). Thus, in some aspects, the machine learning system may select the ground truth image as the image having the highest SNR among the images that are suitable for training. Similarly, the machine learning system may select the input images as the images having comparatively lower SNRs among the images that are suitable for training.

Figure 3:
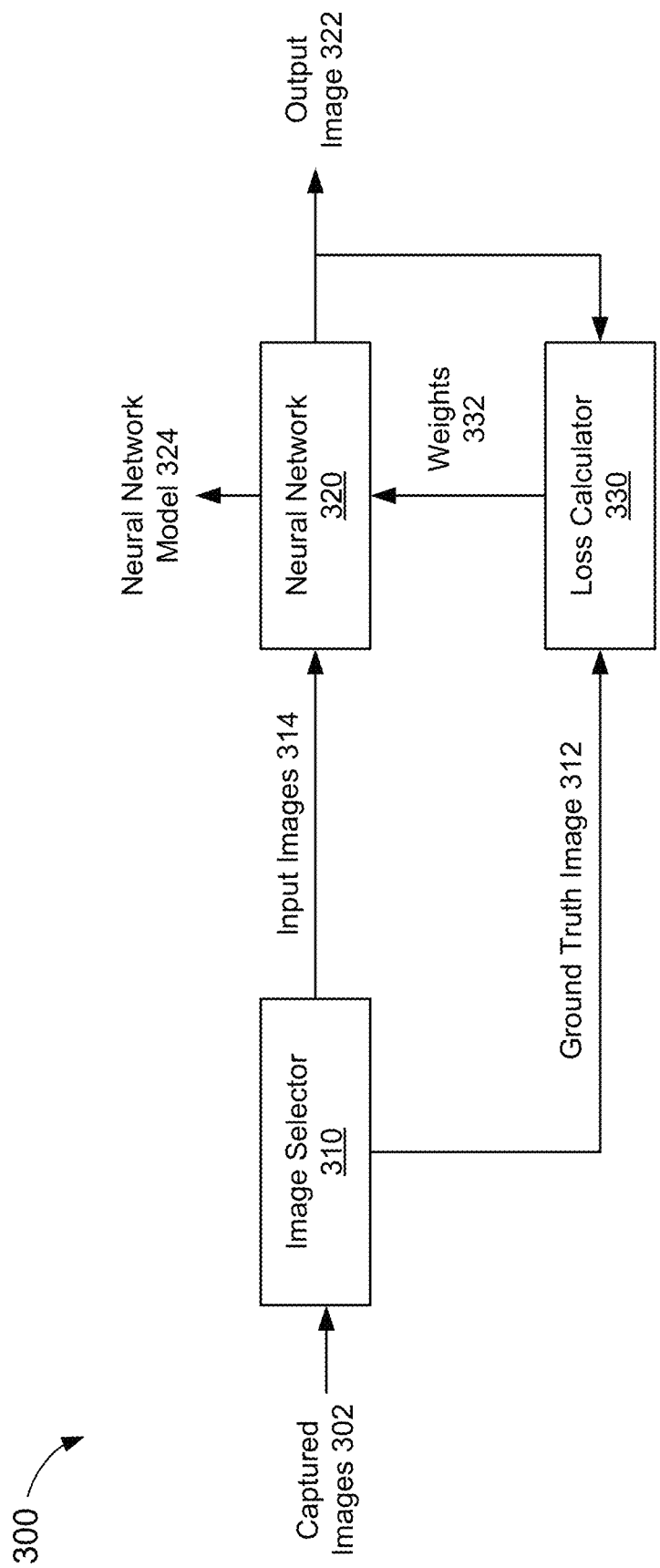
FIG. 3 shows a block diagram of an example machine learning system, according to some implementations.

FIG. 3 shows a block diagram of an example machine learning system 300, according to some implementations. The machine learning system 300 may be configured to produce a neural network model 324 based, at least in part, on a series of captured images 302. In some implementations, the neural network model 324 may be one example of any of the neural network models 122 or 208 of FIGS. 1 and 2, respectively. Thus, the neural network model 324 may include a set of rules that can be used to infer a denoised representation of a low-light image (such as the image 202).

The machine learning system 300 includes an image selector 310, a neural network 320, and a loss calculator 330. In some implementations, the machine learning system 300 may train the neural network 320 to reproduce a ground truth image 312 based on one or more input images 314. For example, each input image 314 may be a short-exposure image captured of a scene in low-light conditions. With reference for example to FIG. 2, the input image 314 may resemble the image 202. In contrast, the ground truth image 312 may be a representative image of the same scene with little or no noise. For example, the ground truth image 312 may be captured using longer exposure or higher gain settings than the input image 314. With reference for example to FIG. 2, the ground truth image 312 may resemble the denoised image 206.

In some implementations, the image selector 310 may select the ground truth image 312 and the one or more input images 314 from the series of captured images 302. For example, each of the images 302 may capture the same (static) scene at a different SNR. In some aspects, each SNR may represent a unique combination of exposure and gain settings. For example, captured images 302 with higher exposure settings (or longer durations) are generally associated with higher SNRs than captured images 302 with lower exposure settings (or shorter durations). Similarly, captured images 302 with higher gain settings are generally associated with higher SNRs than captured images 302 with lower gain settings. In some aspects, each of the images 302 may be captured in response to an incremental adjustment in the amount of exposure or the amount gain associated with the image capture device.

Figure 4:
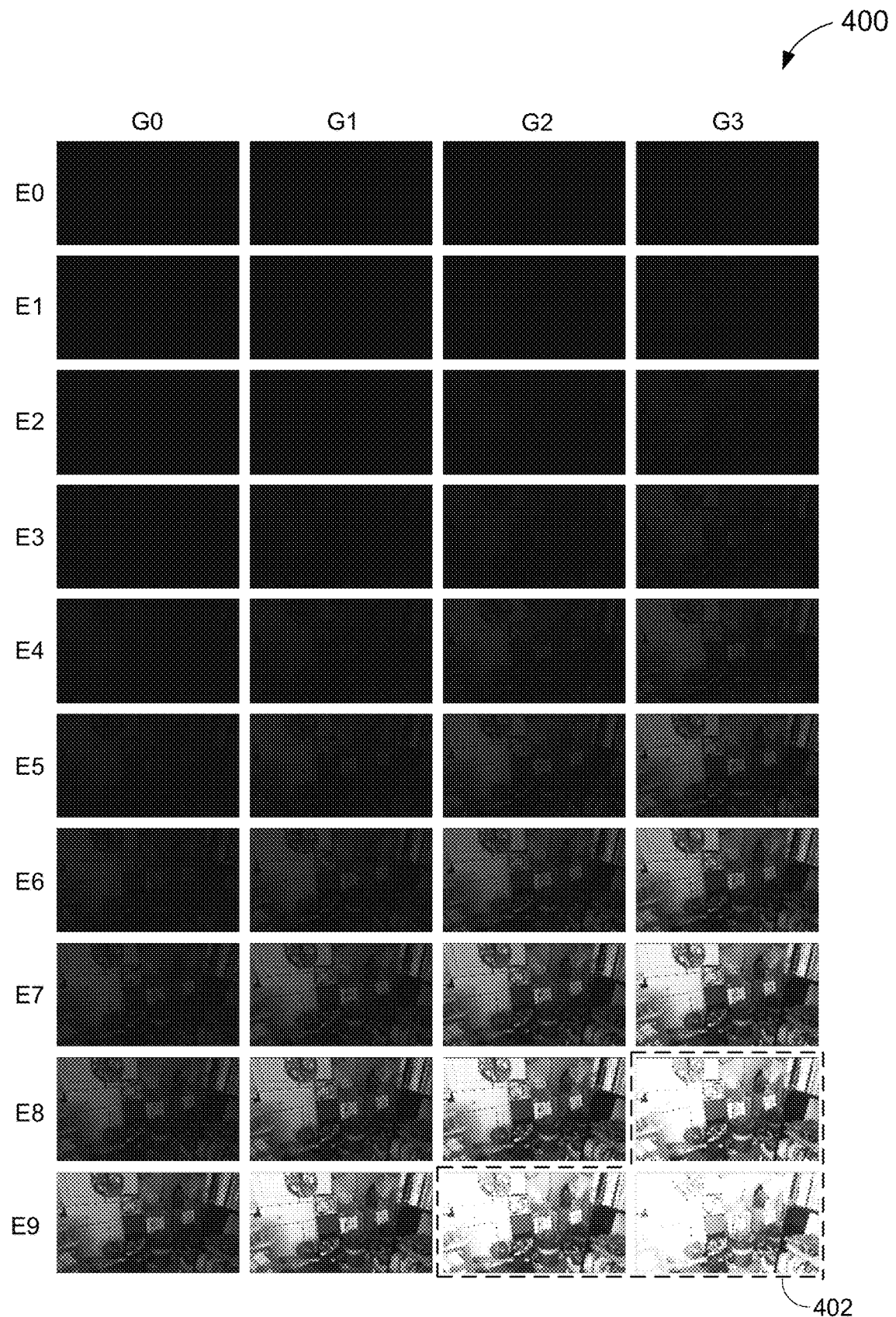
FIG. 4 shows an example series of images usable for training a neural network.

FIG. 4 shows an example series of images 400 usable for training a neural network. In some implementations, the series of images 400 may be one example of the series of captured images 302 of FIG. 3. In the example of FIG. 4, the images are arranged in an array based on their exposure and gain settings. More specifically, the row in which an image is disposed reflects the exposure setting (E0-E9) associated with the image and the column in which an image is disposed reflects the gain setting (G0-G3) associated with the image. In the example of FIG. 4, higher exposure settings represent greater amounts of exposure and higher gain settings represent greater amounts of gain. For example, the series of images 400 may be captured by incrementally adjusting the amount of exposure over a range of expose settings E0-E9 and incrementally adjusting the amount of gain over a range of gain settings G0-G3. Although 40 images are depicted in FIG. 4, the series of images 400 may include fewer or more images in actual implementations.

As described above, the amounts of exposure and gain associated with an image contribute to the SNR of the image. For example, the image associated with gain setting G0 and exposure setting E9 has a higher SNR than the image associated with gain setting G0 and exposure setting E8. Similarly, the image associated with gain setting G1 and exposure setting E9 has a higher SNR than the image associated with gain setting G0 and exposure setting E9. Aspects of the present disclosure recognize that the amount of exposure associated with a given image contributes more to the overall SNR of the image than the amount of gain associated with the image. Thus, the image associated with gain setting G0 and exposure setting E9 has a higher SNR than the image associated with gain setting G1 and exposure setting E8. Accordingly, each of the images in the series 400 may be associated with a respective SNR in a range of SNRs.

In some instances, increasing the exposure or gain beyond a threshold amount may cause the images to saturate. Saturation occurs when photosensors of the image capture device reach a maximum brightness value (causing the corresponding pixels to appear white). Once the photosensors become saturated, further increasing the amounts of exposure or gain may not improve the SNR of the image. In the example of FIG. 4, a subset of images 402 in the series of images 400 are saturated. For example, each of the images in the subset 402 appears washed out, resulting in a loss of detail or contrast. As such, images in the subset 402 may not be suitable for use as ground truth images. Because the images in the subset 402 have very high brightness levels, such images also may not be suitable for use as input images for purposes of training a neural network to infer denoised representations of low-light images.

In some implementations, the image selector 310 may select the ground truth image 312 and the input images 314 from the captured images 302 that are not saturated (also referred to as "non-saturated images"). For example, the image selector 310 may determine a saturation level associated with each of the captured images 302. The image selector 310 may then select the ground truth image 312 and the input images 314 from among the captured images 302 associated with saturation levels that are below a threshold saturation level. With reference for example to FIG. 4, the ground truth image 312 and input images 314 may be selected from any of the images in the series of images 400 outside of the subset 402. In some aspects, the ground truth image 312 may be the non-saturated image associated with the highest SNR among the SNRs associated with the non-saturated images. In some aspects, the input images 314 may include one or more of the remaining non-saturated images that are associated with lower SNRs than the SNR associated with the ground truth image 312.

The neural network 320 receives the input images 314 and attempts to recreate the ground truth image 312. For example, the neural network 320 may form a network of connections across multiple layers of artificial neurons that begin with the input images 314 and lead to an output image 322. The connections are weighted to result in an output image 322 that closely resembles the ground truth image 312. For example, the training operation may be performed over multiple iterations. In each iteration, the neural network 320 produces an output image 322 based on the weighted connections across the layers of artificial neurons, and the loss calculator 330 updates the weights 332 associated with the connections based on an amount of loss (or error) between the output image 322 and the ground truth image 312. The neural network 320 may output the weighted connections as the neural network model 324 when certain convergence criteria are met (such as when the loss falls below a threshold level or after a predetermined number of training iterations).

Figure 5:
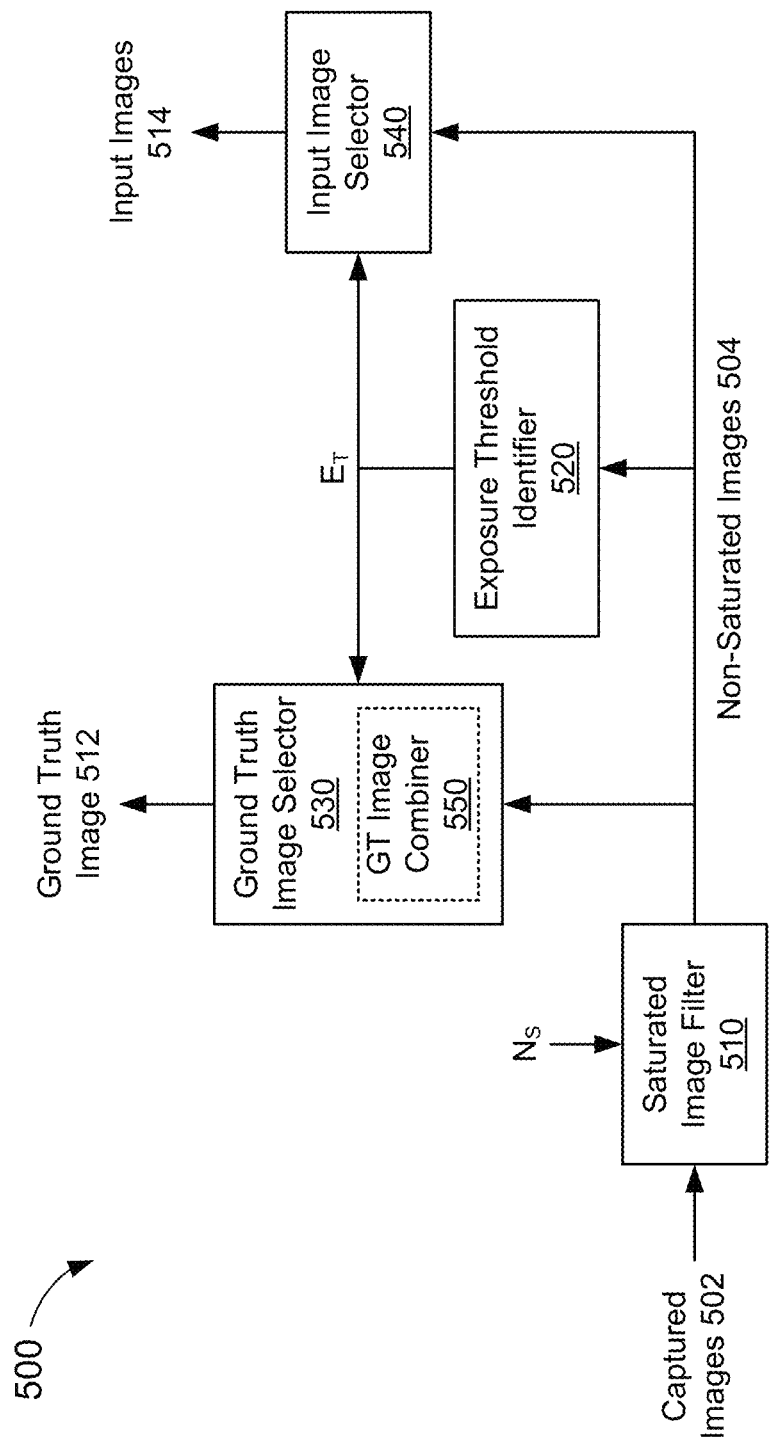
FIG. 5 shows a block diagram of an example image selector for a machine learning system, according to some implementations.

FIG. 5 shows a block diagram of an example image selector 500 for a machine learning system, according to some implementations. In some implementations, the image selector 500 may be one example of the image selector 310 of FIG. 3. Thus, the image selector 500 may be configured to select a ground truth image 512 and one or more input images 514 from a series of captured images 502. In some implementations, the series of captured images 502 may be one example of the series of images 400 of FIG. 4. Thus, each of the images 502 may be captured using a different combination of exposure and gain settings.

The image selector 500 includes a saturated image filter 510, an exposure threshold identifier 520, a ground truth image selector 530, and an input image selector 540. The saturated image filter 510 receives the captured images 502 and outputs a subset of non-saturated images 504. In other words, the saturated image filter 510 may filter or remove one or more saturated images from the captured images 502. In some implementations, the saturated image filter 510 may classify each of the captured images 502 as a saturated image or a non-saturated image based on a number (N) of saturated pixels in each image. For example, each of the captured images 502 may include a number of pixels each having a value associated with a range of pixel values. As used herein, the term "pixel saturation value" refers to the maximum pixel value in the range of pixel values, and any pixel having a value equal to the pixel saturation value may be referred to herein as a "saturated pixel."

As described above, the pixel saturation value reflects a saturated state of the photosensor in the image capture device used to acquire the image. Aspects of the present disclosure recognize that, because the value of a pixel cannot exceed the pixel saturation value, saturated pixels may not accurately represent the actual brightness of a given scene. Thus, captured images 502 that include too many saturated pixels may not be suitable for use as the ground truth image 512 or the input images 514. In some implementations, the saturated image filter 510 may count or otherwise determine the number of saturated pixels N in each of the captured images 502 and determine whether the number N is greater than a threshold number ($N_s$). For example, the threshold number $N_s$ may represent a percentage (such as 1% or 5%) of the total number of pixels in each image.

If the number of saturated pixels N is greater than the threshold number $N_s$, the saturated image filter 510 may classify the captured image 502 as a saturated image. If the number of saturated pixels N is less than or equal to the threshold number $N_s$, the saturated image filter 510 may classify the captured image 502 as a non-saturated image 504. With reference for example to FIG. 4, the number of saturated pixels N in each image of the subset 402 may exceed the threshold number $N_s$. Thus, the saturated image filter 510 may classify each of the images in the subset 402 as a saturated image. In contrast, the number of saturated pixels N in each of the remaining images in the series 400 (outside of the subset 402) may be less than or equal to the threshold number $N_s$. Thus, the saturated image filter 510 may classify the remaining images in the series 400 as non-saturated images 504.

Aspects of the present disclosure recognize that some regions of an image may have a more significant impact on the training process than other regions. For example, an image captured under non-uniform lighting conditions may include regions that are significantly brighter (or darker) than other regions of the same image. As a result, the overall number of saturated pixels in any given image may be skewed by the brighter regions of the image. However, in some implementations, the darker regions of an image may contribute more to the training of a neural network model than the brighter regions of the image. In such implementations, the saturated image filter 510 may consider only a subset of pixels within a desired region of each image for purposes of classifying captured images 502 as non-saturated images 504 (or saturated images). For example, the saturated image filter 510 may classify a captured image 502 as a non-saturated image 504 only if the number of saturated pixels (N) within the desired region is greater than the threshold number $N_s$.

The exposure threshold identifier 520 determines a threshold amount of exposure ($E_T$) associated with the non-saturated images 504. In some aspects, the threshold amount $E_T$ may represent the highest amount of exposure (or highest exposure setting) among the amounts of exposure associated with the non-saturated images 504. With reference for example to FIG. 4, the series of images 400 includes two non-saturated images associated with exposure setting E9 (and gain settings G0 and G1), which is the maximum exposure setting in the range of exposure settings E0-E9. As such, exposure setting E9 represents the highest amount of exposure associated with any of the non-saturated images. Thus, the exposure threshold identifier 520 may determine the threshold amount of exposure $E_T$ for the series of images 400 to be equal to the amount of exposure associated with exposure setting E9.

The ground truth image selector 530 selects one or more of the non-saturated images 504 to be the ground truth image 512 based, at least in part, on the threshold amount of exposure $E_T$. For example, the series of captured images 502 may include one or more non-saturated images 504 that are associated with the threshold amount of exposure $E_T$ (but different amounts of gain). In some implementations, the ground truth image selector 530 may identify each of the non-saturated images 504 that are associated with the threshold amount of exposure $E_T$ and select one or more of the identified images to be the ground truth image 512. More specifically, the ground truth image selector 530 may select one or more of the non-saturated image 504 associated with the highest amounts of gain among the amounts of gain associated with the identified images. With reference for example to FIG. 4, the ground truth image selector 530 may select the non-saturated image associated with exposure setting E9 and gain setting G1 to be the ground truth image 512.

The input image selector 540 selects one or more of the non-saturated images 504 to be the input images 514 based, at least in part, on the threshold amount of exposure $E_T$. As described above, each of the input images 514 is to be paired with the ground truth image 512 for purposes of training a neural network to infer a denoised image. Thus, each of the input images 512 should be noisier than the ground truth image 512. In some implementations, the input image selector 540 may select the non-saturated images 504 associated with any amount of exposure less than the threshold amount $E_T$ to be the input images 514. With reference for example to FIG. 4, the input image selector 540 may select the input images 514 to include the images associated with exposure settings E0-E8 and gain setting G0, the images associated with exposure settings E0-E8 and gain setting G1, the images associated with exposure settings E0-E8 and gain setting G2, and the images associated with exposure settings E0-E7 and gain setting G3.

Aspects of the present disclosure recognize that low-light images are often captured with the highest allowable gain settings to achieve optimal SNR. Thus, in some other implementations, the input image selector 540 may select the input images 514 to have a higher gain bias. For example, the input image selector 540 may select the input images 514 to include a greater number of images associated with the highest gain setting (such as gain setting G3 of FIG. 4) than the number of images associated with any one of the remaining gain settings (such as gain settings G0-G2 of FIG. 4).

In some implementations, the ground truth image selector 530 may include a ground truth (GT) image combiner that is configured to combine pixels from two or more of the non-saturated images 504 to produce the ground truth image(s) 512. As described above with reference to FIG. 4 images captured with different exposure and gain settings will have different SNRs. Aspects of the present disclosure recognize that pixel values from different non-saturated images 504 can be combined or merged together to produce a new ground truth image 512 with even higher SNR than any of the existing non-saturated images 504. In such implementations, each ground truth image 512 may be a composite of the pixel values associated with multiple non-saturated images 504.

Figure 6:
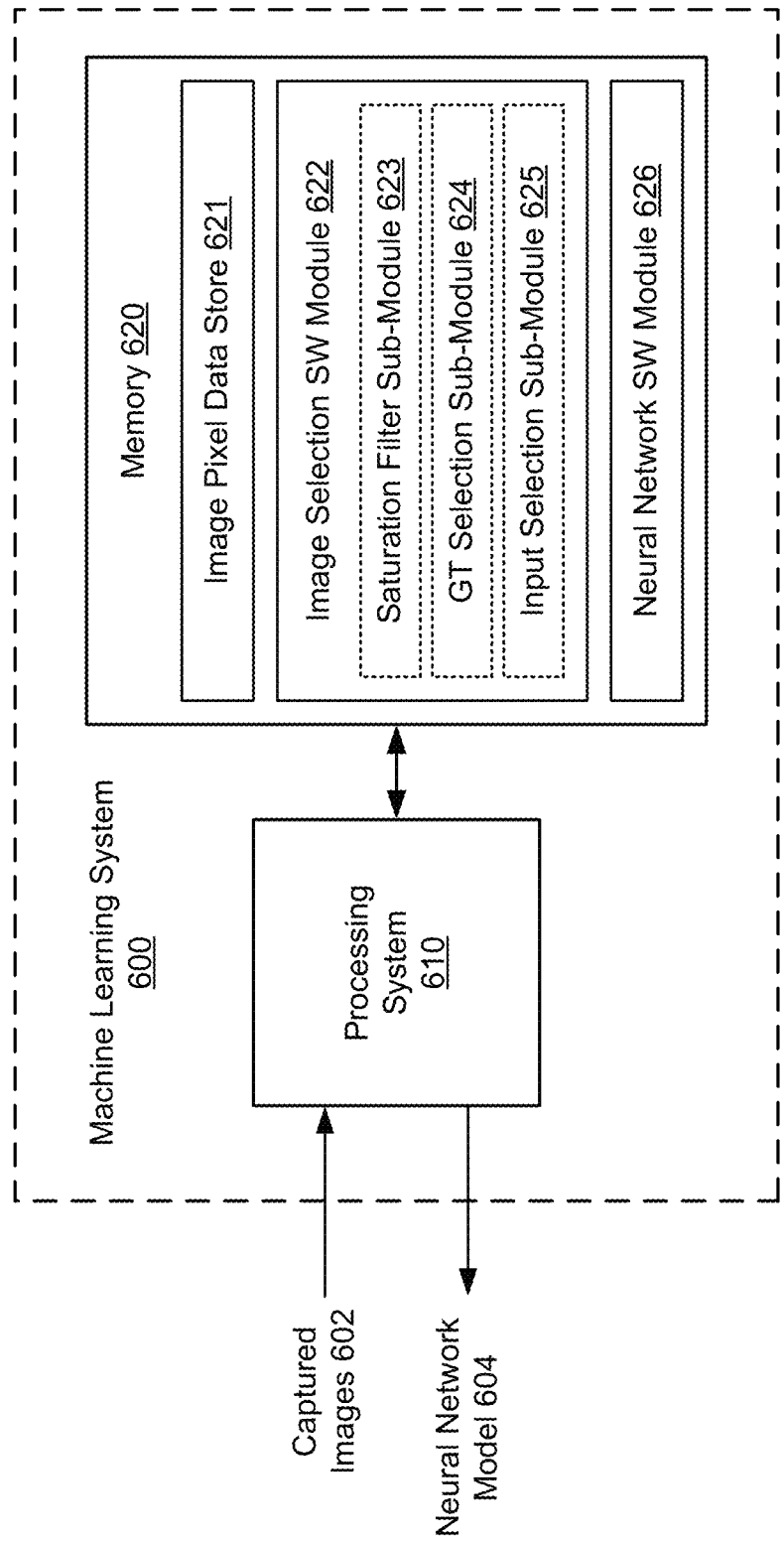
FIG. 6 shows an example machine learning system, according to some implementations.

FIG. 6 shows an example machine learning system 600, according to some implementations. In some implementations, the machine learning system 600 may be one example of the machine learning system 300 of FIG. 3. Thus, the machine learning system 600 may be configured to produce a neural network model 604 based, at least in part, on a series of captured images 602. In some implementations, the series of captured images 602 may be one example of the series of images 400 of FIG. 4. In some implementations, the machine learning system 600 may include a processing system 610 and a memory 620.

The memory 620 may include an image pixel data store 621 configured to store the captured images 602 or any intermediate images produced by the machine learning system 600. In some aspects, each of the images 602 may be captured using a different combination of exposure and gain settings. The memory 620 also may include a non-transitory computer-readable medium (including one or more nonvolatile memory elements, such as EPROM, EEPROM, Flash memory, a hard drive, and the like) that may store at least the following software (SW) modules:

an image selection SW module 622 to select a ground truth image and one or more input images from the series of captured images 602, the image selection SW module 622 further including:
  a saturation filter sub-module 623 to classify each of the captured images 602 as a saturated image or a non-saturated image based on a number of saturated pixels in each image;
  a ground truth selection sub-module 624 to select one of the non-saturated images to be the ground truth image based on the exposure and gain settings associated with each image; and
  an input selection sub-module 625 to select one or more of the non-saturated images to be the input images based on the exposure settings associated with each image; and
a neural network SW module 626 to produce the neural network model 604 by learning a set of rules that can be used to recreate the ground truth image based on each of the input images.

Each software module includes instructions that, when executed by the processing system 610, causes the machine learning system 600 to perform the corresponding functions.

The processing system 610 may include any suitable one or more processors capable of executing scripts or instructions of one or more software programs stored in the machine learning system 600 (such as in memory 620). For example, the processing system 610 may execute the image selection SW module 622 to select a ground truth image and one or more input images from the series of captured images 602. The processing system 610 also may execute the neural network SW module 626 to produce the neural network model 604 by learning a set of rules that can be used to recreate the ground truth image based on each of the input images.

In executing the image selection SW module 622, the processing system 610 may further execute the saturation filter sub-module 623, the ground truth selection sub-module 624, and the input selection sub-module 625. For example, the processing system 610 may execute the saturation filter sub-module 623 to classify each of the captured images 602 as a saturated image or a non-saturated image based on a number of saturated pixels in each image. Further, the processing system 610 may execute the ground truth selection sub-module 624 to select one of the non-saturated images to be the ground truth image based on the exposure and gain settings associated with each image. Still further, the processing system 610 may execute the input selection sub-module 625 to select one or more of the non-saturated images to be the input images based on the exposure settings associated with each image.

Figure 7:
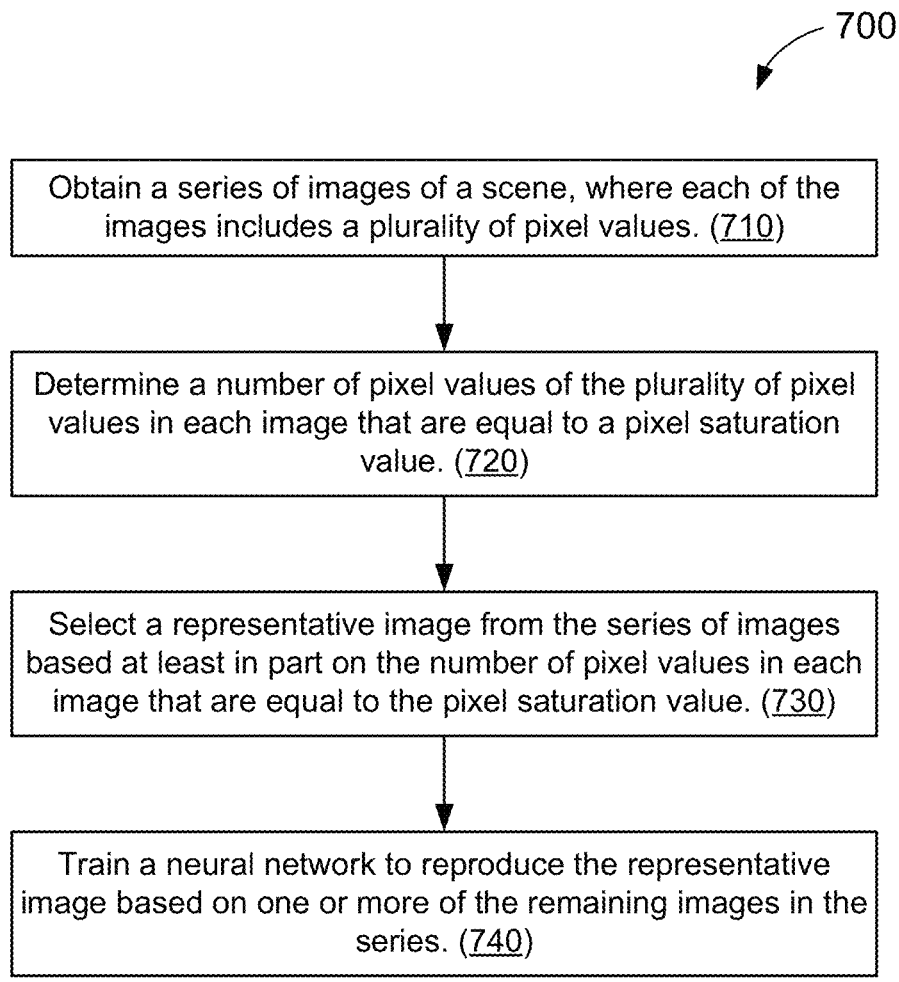
FIG. 7 shows an illustrative flowchart depicting an example operation for training neural networks, according to some implementations.

FIG. 7 shows an illustrative flowchart depicting an example operation 700 for training neural networks, according to some implementations. In some implementations, the example operation 700 may be performed by a machine learning system (such as the machine learning system 300 of FIG. 3) to train a neural network to infer denoised representations of low-light images.

The machine learning system obtains a series of images of a scene, where each of the images includes a plurality of pixel values (710). For example, each of the images may include a number of pixels each having a value associated with a range of pixel values. In some implementations, each of the images may be captured using a different combination of exposure and gain settings (such as described with reference to FIG. 4). The amounts of exposure and gain associated with each image contribute to an SNR of the image. However, the amount of exposure associated with an image may contribute more to the overall SNR of the image than the amount of gain. Thus, each of the images in the series may be associated with a respective SNR in a range of SNRs.

The machine learning system determines a number of pixel values of the plurality of pixel values in each image that are equal to a pixel saturation value (720). For example, the pixel saturation value may be the maximum pixel value in the range of pixel values, which reflects a saturated state of the photosensor (or pixel) in the image captured device. Thus, images that include too many saturated pixels may not be suitable for use in training the neural network. In some implementations, the machine learning system may classify each of the images as a saturated image or a non-saturated based on whether the number of saturated pixels in the image exceeds a threshold number.

The machine learning system selects a representative image from the series of images based at least in part on the number of pixel values in each image that are equal to the pixel saturation value (730). For example, the representative image may be a low-noise ground truth image (such as any of the ground truth images 312 or 512 of FIGS. 3 and 5, respectively). In some implementations, the machine learning system may select the ground truth image from among the non-saturated images in the series of images. More specifically, the machine learning system may select the non-saturated image having the highest SNR among the SNRs associated with the non-saturated images to be the ground truth image.

The machine learning system trains a neural network to reproduce the representative image based on one or more of the remaining images in the series (740). For example, the one or more remaining images may be noisy input images (such as any of the input images 314 or 514 of FIGS. 3 and 5, respectively). In some implementations, the machine learning system may select the input images from among the remaining non-saturated images in the series of images (associated with a lower SNR than the SNR of the ground truth image). During training, the neural network may learn a set of rules that can be used to infer denoised representations of the input images.

Figure 8:
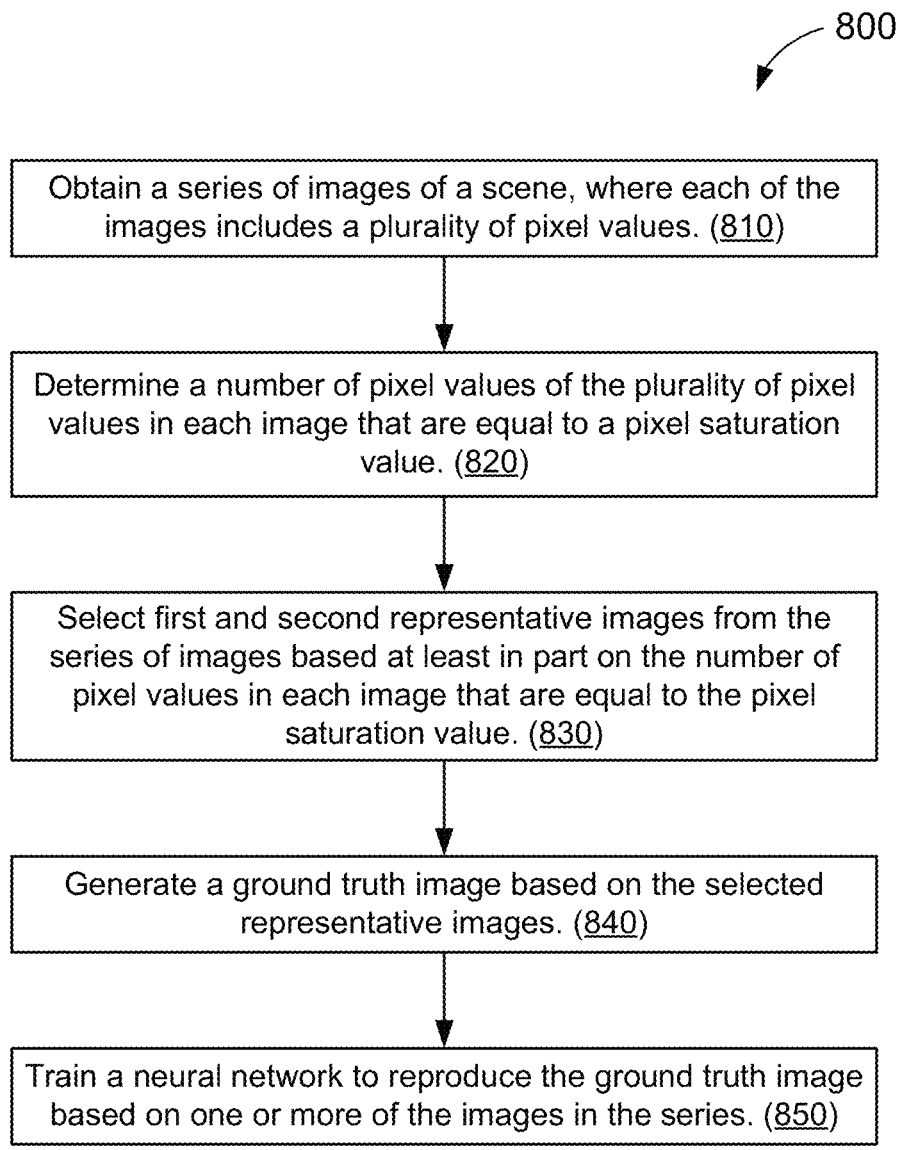
FIG. 8 shows an illustrative flowchart depicting an example operation for training neural networks, according to some implementations.

FIG. 8 shows an illustrative flowchart depicting an example operation 800 for training neural networks, according to some implementations. In some implementations, the example operation 800 may be performed by a machine learning system (such as the machine learning system 300 of FIG. 3) to train a neural network to infer denoised representations of low-light images.

The machine learning system obtains a series of images of a scene, where each of the images includes a plurality of pixel values (810). For example, each of the images may include a number of pixels each having a value associated with a range of pixel values. In some implementations, each of the images may be captured using a different combination of exposure and gain settings (such as described with reference to FIG. 4). The amounts of exposure and gain associated with each image contribute to an SNR of the image. However, the amount of exposure associated with an image may contribute more to the overall SNR of the image than the amount of gain. Thus, each of the images in the series may be associated with a respective SNR in a range of SNRs.

The machine learning system determines a number of pixel values of the plurality of pixel values in each image that are equal to a pixel saturation value (820). For example, the pixel saturation value may be the maximum pixel value in the range of pixel values, which reflects a saturated state of the photosensor (or pixel) in the image captured device. Thus, images that include too many saturated pixels may not be suitable for use in training the neural network. In some implementations, the machine learning system may classify each of the images as a saturated image or a non-saturated based on whether the number of saturated pixels in the image exceeds a threshold number.

The machine learning system selects first and second representative images from the series of images based at least in part on the number of pixel values in each image that are equal to the pixel saturation value (830). In some implementations, the machine learning system may select the representative images from among the non-saturated images in the series of images. More specifically, the machine learning system may select the non-saturated image having the highest SNRs among the SNRs associated with the non-saturated images to be the representative images.

The machine learning system generates a ground truth image based on the selected representative images (840). For example, the machine learning system may combine pixel values from each of the representative images to produce the ground truth image. As such, the ground truth image may be a composite of the pixel values associated with the first and second representative images.

The machine learning system trains a neural network to reproduce the ground truth image based on one or more of the images in the series (850). For example, the one or more remaining images may be noisy input images (such as any of the input images 314 or 514 of FIGS. 3 and 5, respectively). In some implementations, the machine learning system may select the input images from among the remaining non-saturated images in the series of images (associated with a lower SNR than the SNR of the ground truth image). During training, the neural network may learn a set of rules that can be used to infer denoised representations of the input images.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of training neural networks, comprising:
obtaining a series of images of a scene, each of the images including a plurality of pixel values;
determining a number of pixel values of the plurality of pixel values in each image that are equal to a pixel saturation value;
selecting a representative image from the series of images based at least in part on the number of pixel values in each image that are equal to the pixel saturation value; and
training a neural network to reproduce the representative image based on a plurality of remaining images in the series, the plurality of remaining images in the series not including the representative image.

2. The method of claim 1, wherein the determining of the number of pixel values comprises:
selecting, in each of the images, a region coinciding with a respective subset of pixel values of the plurality of pixel values, the number of pixel values equal to the pixel saturation value coinciding with the selected region in each image.

3. The method of claim 1, wherein the pixel saturation value is the maximum pixel value among the pluralities of pixel values.

4. The method of claim 1, further comprising:
determining whether the number of pixel values equal to the pixel saturation value in each image is greater than a threshold amount; and
classifying each of the images as a saturated image or a non-saturated image based on whether the number of pixel values equal to the pixel saturation value exceeds the threshold amount, the number of pixel values equal to the pixel saturation value in each of the saturated images being greater than the threshold amount and the number of pixel values equal to the pixel saturation value in each of the non-saturated images being less than or equal to the threshold amount.

5. The method of claim 4, wherein the representative image is one of the non-saturated images.

6. The method of claim 4, wherein each of the plurality of remaining images is a respective one of the non-saturated images.

7. The method of claim 4, wherein each of the images is associated with a respective signal-to-noise ratio (SNR).

8. The method of claim 7, wherein the selecting of the representative image comprises:
determining the highest SNR among the SNRs associated with the non-saturated images, the representative image being the non-saturated image associated with the determined SNRs.

9. The method of claim 7, wherein the SNR associated with each image represents an amount of exposure and an amount of gain associated with the image.

10. The method of claim 9, wherein the selecting of the representative image comprises:
determining the highest amount of exposure among the amounts of exposure associated with the non-saturated images;
identifying each of the non-saturated images that are associated with the determined amount of exposure; and
determining the highest amount of gain among the amounts of gain associated with the identified non-saturated images, the representative image being the non-saturated image associated with the determined amount of exposure and the determined amount of gain.

11. The method of claim 10, wherein the training of the neural network comprises:
selecting the plurality of remaining images based at least in part on the amounts of exposure associated with the images.

12. The method of claim 11, wherein the amount of exposure associated with each of the plurality of remaining images is lower than the determined amount of exposure.

13. A machine learning system comprising:
a processing system; and
a memory storing instructions that, when executed by the processing system, causes the machine learning system to:
obtain a series of images of a scene, each of the images including a plurality of pixel values;
determine a number of pixel values of the plurality of pixel values in each image that are equal to a pixel saturation value;
select a representative image from the series of images based at least in part on the number of pixel values in each image that are equal to the pixel saturation value; and
train a neural network to reproduce the representative image based on a plurality of remaining images in the series, the plurality of remaining images in the series not including the representative image.

14. The machine learning system of claim 13, wherein execution of the instructions further causes the machine learning system to:
determine whether the number of pixel values equal to the pixel saturation value in each image is greater than a threshold amount; and
classify each of the images as a saturated image or a non-saturated image based on whether the number of pixel values equal to the pixel saturation value exceeds the threshold amount, the number of pixel values equal to the pixel saturation value in each of the saturated images being greater than the threshold amount and the number of pixel values equal to the pixel saturation value in each of the non-saturated images being less than or equal to the threshold amount.

15. The machine learning system of claim 14, wherein each of the images is associated with a respective signal-to-noise ratio (SNR), execution of the instructions for selecting the representative image causing the machine learning system to:
    determine the highest SNR among the SNRs associated with the non-saturated images, the representative image being the non-saturated image associated with the determined SNRs.

16. The machine learning system of claim 14, wherein each of the images is associated with an amount of exposure and an amount of gain, execution of the instructions for selecting the representative image causing the machine learning system to:
    determine the highest amount of exposure among the amounts of exposure associated with the non-saturated images;
    identify each of the non-saturated images associated with the determined amount of exposure; and
    determine the highest amount of gain among the amounts of gain associated with the identified non-saturated images, the representative image being the non-saturated image associated with the determined amount of exposure and the determined amount of gain.

17. The machine learning system of claim 16, wherein execution of the instructions for training the neural network causes the machine learning system to:
    select the plurality of remaining images based at least in part on the amounts of exposure associated with the images, the amount of exposure associated with each of the plurality of remaining images being lower than the determined amount of exposure.

18. A method of training neural networks, comprising:
    obtaining a series of images of a scene, each of the images including a plurality of pixel values;
    determining a number of pixel values of the plurality of pixel values in each image that are equal to a pixel saturation value;
    selecting first and second representative images from the series of images based at least in part on the number of pixel values in each image that are equal to the pixel saturation value;
    generating a ground truth image based on the selected representative images; and
    training a neural network to reproduce the ground truth image based on a plurality of the images in the series.

19. The method of claim 18, further comprising:
    determining a number of pixel values in each of the images that are equal to a pixel saturation value;
    determining whether the number of pixel values equal to the pixel saturation value in each image exceeds a threshold amount; and
    classifying each of the images as a saturated image or a non-saturated image based on whether the number of pixel values equal to the pixel saturation value exceeds the threshold amount, the number of pixel values equal to the pixel saturation value in each of the saturated images being greater than the threshold amount and the number of pixel values equal to the pixel saturation value in each of the non-saturated images being less than or equal to the threshold amount.

20. The method of claim 18, wherein, the generating of the ground truth image comprises:
    selecting a first subset of pixel values of the plurality pixel values in the first representative image;
    selecting a second subset of pixel values of the plurality of pixel values in the second representative image; and
    combining the first subset of pixel values with the second subset of pixel values in the ground truth image.

* * * * *